(12) United States Patent
Ohmori et al.

(10) Patent No.: US 8,408,586 B2
(45) Date of Patent: Apr. 2, 2013

(54) CURTAIN AIRBAG DEVICE FOR VEHICLE

(75) Inventors: Tomohisa Ohmori, Hiroshima (JP);
Taei Shibahara, Hiroshima (JP);
Hideharu Saiki, Hiroshima (JP);
Junichi Yoshinaga, Settsu (JP); Miwa Matsuoka, Settsu (JP); Tomoki Hashizume, Settsu (JP)

(73) Assignees: Mazda Motor Corporation (JP);
Ashimori Industry Co., Ltd. (JP)

( * ) Notice: Subject to any disclaimer, the term of this patent is extended or adjusted under 35 U.S.C. 154(b) by 0 days.

(21) Appl. No.: 13/581,289

(22) PCT Filed: Feb. 23, 2011

(86) PCT No.: PCT/JP2011/001041
§ 371 (c)(1),
(2), (4) Date: Aug. 24, 2012

(87) PCT Pub. No.: WO2011/105080
PCT Pub. Date: Sep. 1, 2011

(65) Prior Publication Data
US 2012/0319385 A1    Dec. 20, 2012

(30) Foreign Application Priority Data

Feb. 25, 2010 (JP) ................................ 2010-040229

(51) Int. Cl.
*B60R 21/16* (2006.01)
(52) U.S. Cl. .................................... 280/728.2; 280/730.2
(58) Field of Classification Search ............... 280/728.2, 280/728.3, 730.2
See application file for complete search history.

(56) References Cited

U.S. PATENT DOCUMENTS

| | | | | |
|---|---|---|---|---|
| 6,296,269 B1 * | 10/2001 | Nagai et al. | ................. | 280/728.2 |
| 6,520,533 B2 | 2/2003 | Tanase et al. | | |
| 6,619,690 B2 | 9/2003 | Tanase et al. | | |
| 7,077,424 B2 * | 7/2006 | Inoue | ......................... | 280/730.2 |
| 7,520,527 B2 | 4/2009 | Yamagiwa et al. | | |

(Continued)

FOREIGN PATENT DOCUMENTS

| | | |
|---|---|---|
| EP | 1 978 430 A1 | 10/2008 |
| JP | 3498264 B2 | 2/2004 |

OTHER PUBLICATIONS

International Search Report; PCT/JP2011/001041; Oct. 7, 2011.

*Primary Examiner* — Faye M. Fleming
(74) *Attorney, Agent, or Firm* — Studebaker & Brackett PC; Donald R. Studebaker

(57) ABSTRACT

A curtain airbag device for a vehicle has a curtain airbag main body 17 that is disposed along a longitudinal direction of a vehicle body while covered with an A pillar trim 41 and roof trim 42, and folded in an A pillar 7 and a roof side rail part 30 of the vehicle body so as to be able to deploy downward within a cabin. The curtain airbag main body 17 is provided with a twisted part 17b that is twisted such that an initial deployment force, generated upon inflation and deployment of the curtain airbag main body 17 located in a vicinity of the A pillar trim 41, is acted in a separation direction in which the A pillar trim 41 is parted away from the A pillar part 7, to push open the A pillar trim 41 toward an inside of the cabin. At least an upper surface of the twisted part 17b is regulated by a supporting bracket 21 and disposed in the vehicle body.

6 Claims, 13 Drawing Sheets

U.S. PATENT DOCUMENTS

| | | | |
|---|---|---|---|
| 8,033,569 B2 * | 10/2011 | Yamanishi et al. | ........ 280/730.2 |
| 2001/0006287 A1 | 7/2001 | Tanase et al. | |
| 2003/0047920 A1 | 3/2003 | Tanase et al. | |
| 2007/0228700 A1 | 10/2007 | Yamagiwa et al. | |

* cited by examiner

[Fig. 1]
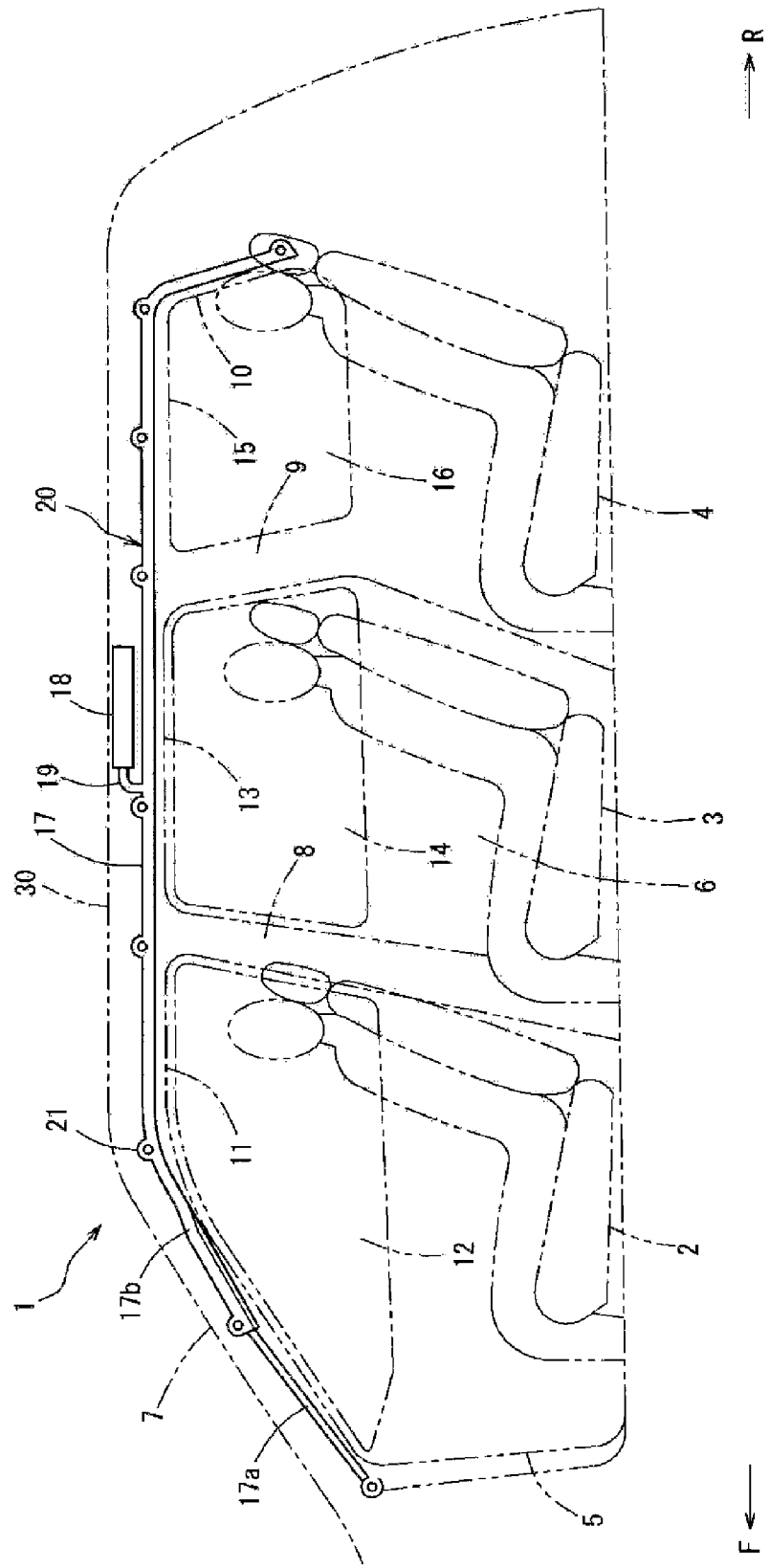

[Fig. 2]
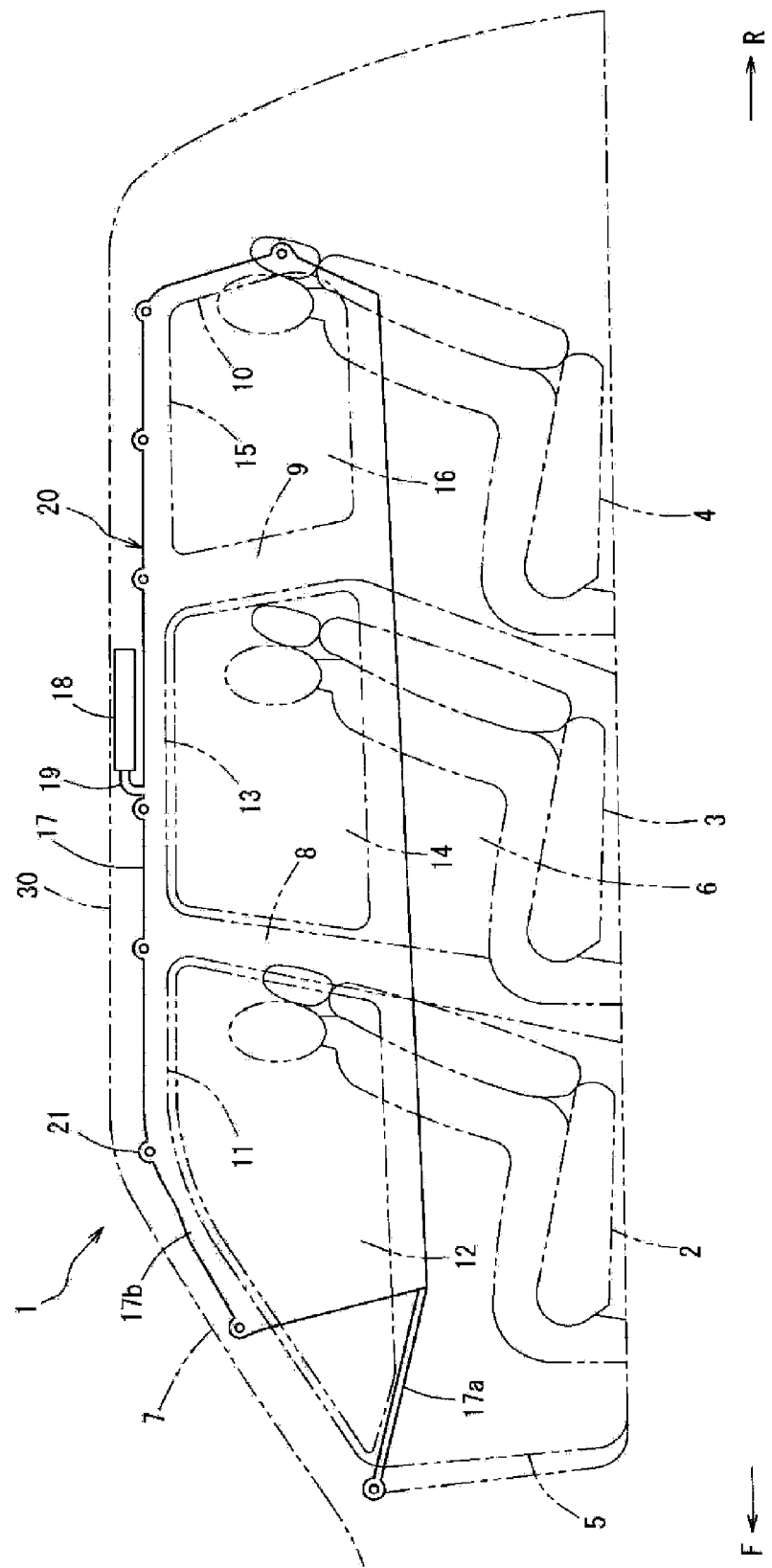

[Fig. 3]
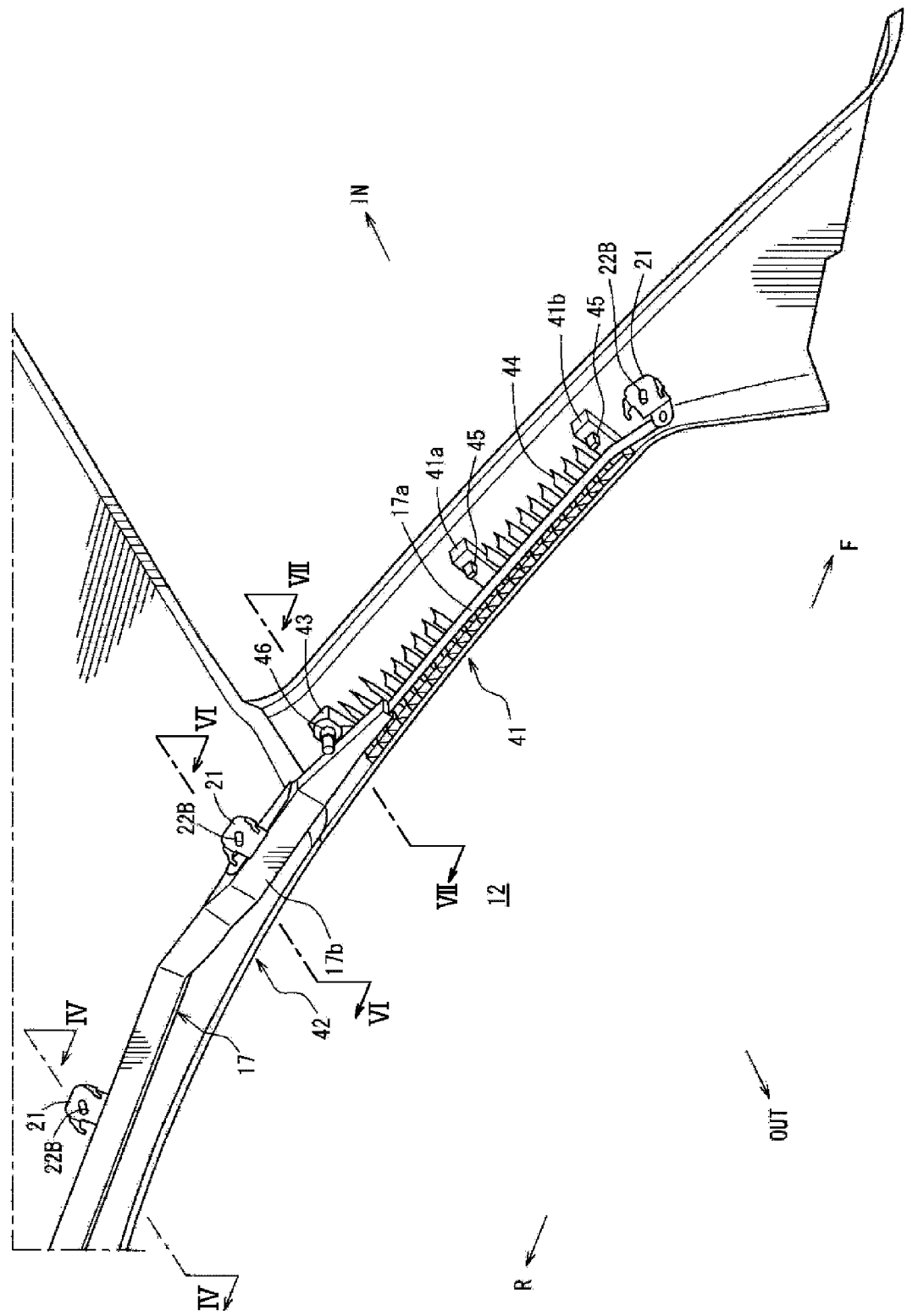

[Fig. 4]
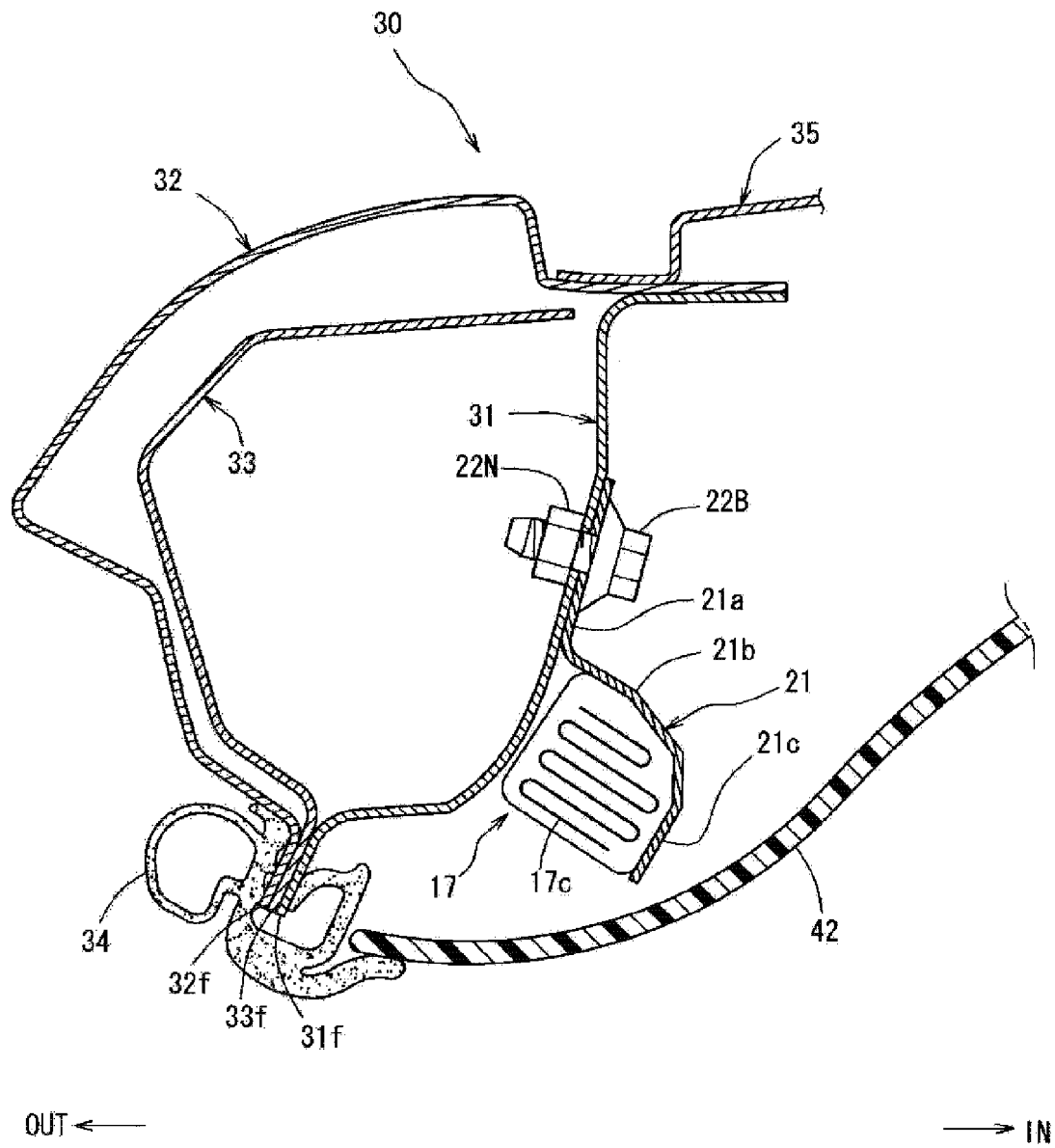

[Fig. 5]
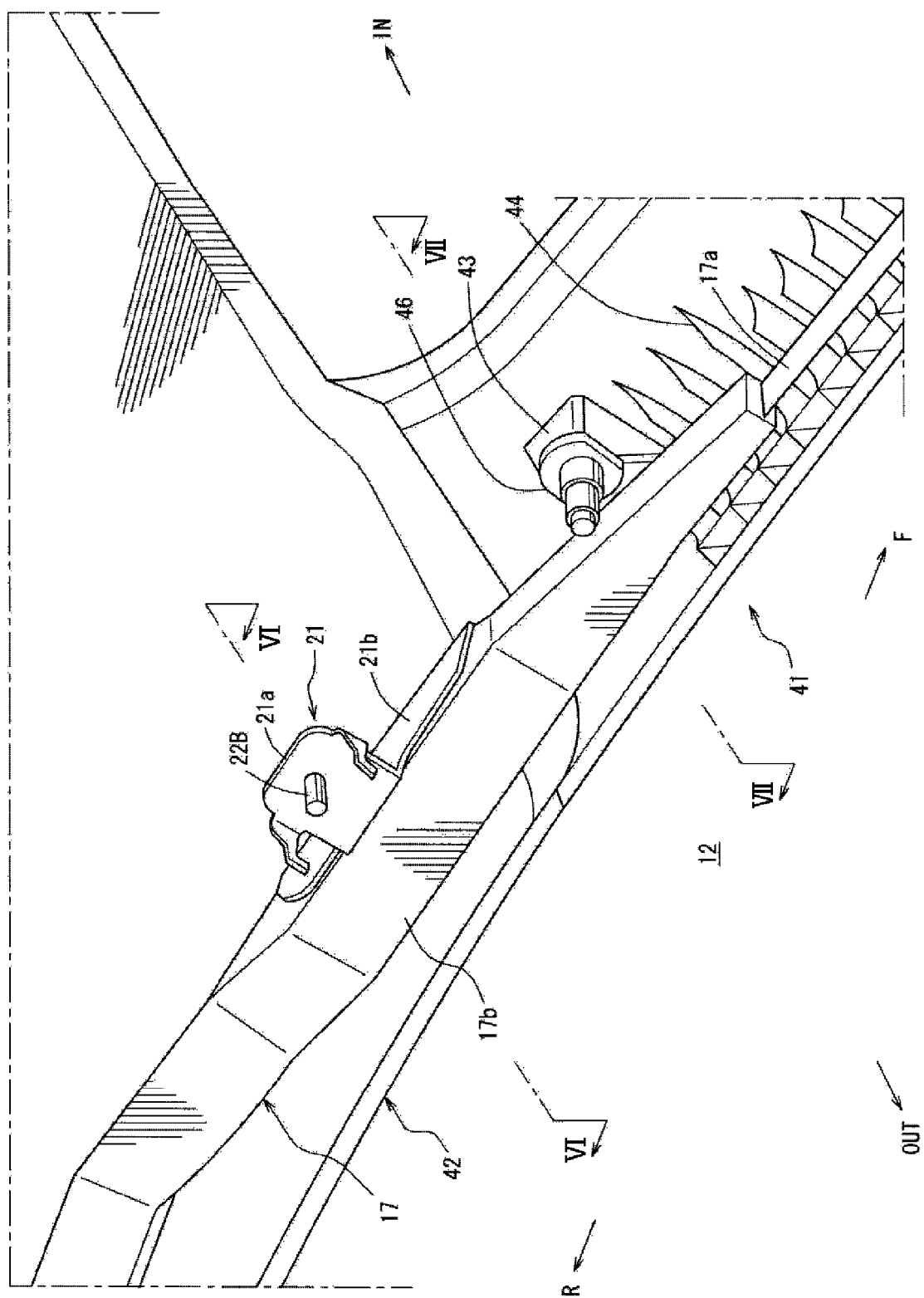

[Fig. 6]
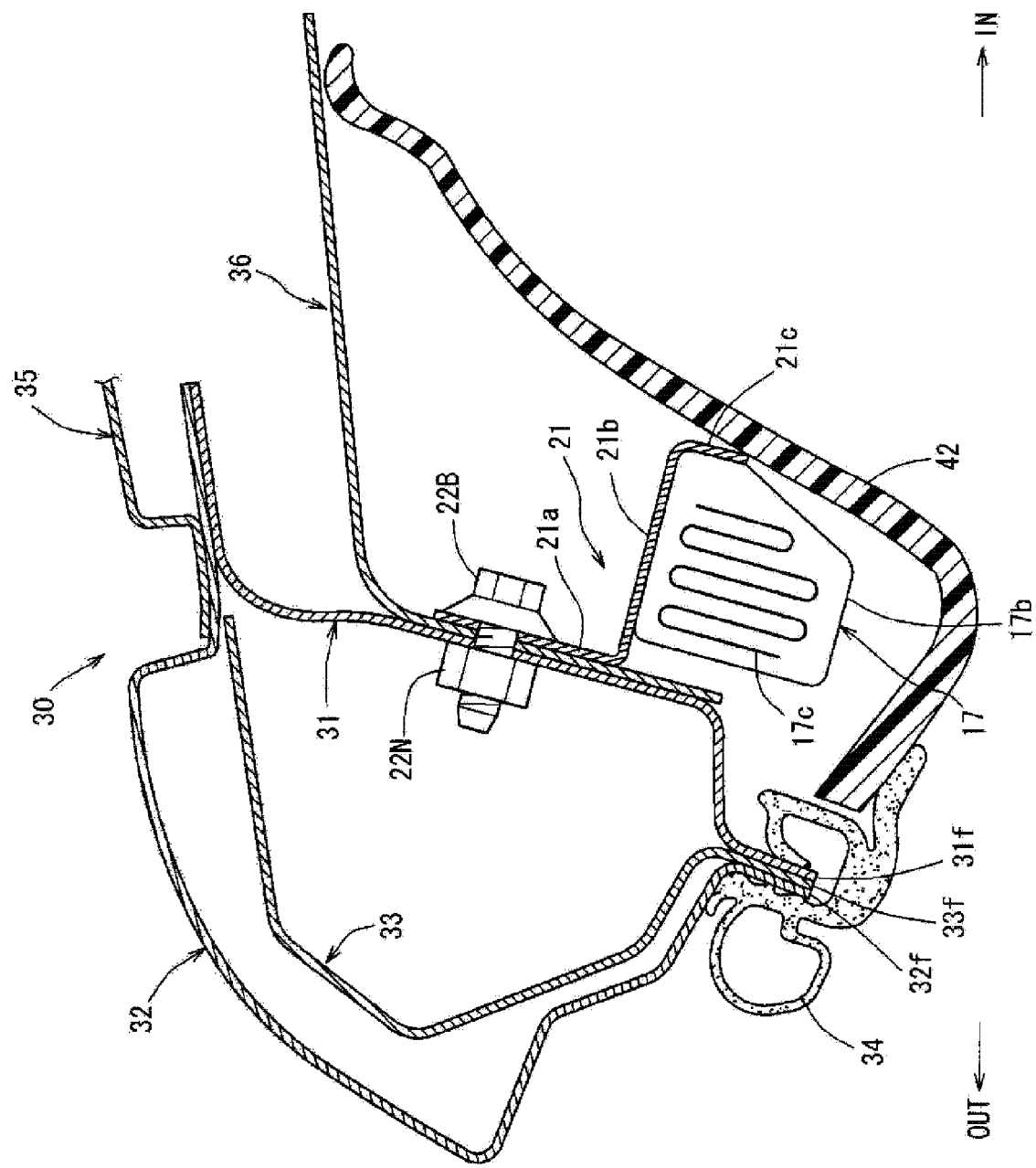

[Fig. 7]
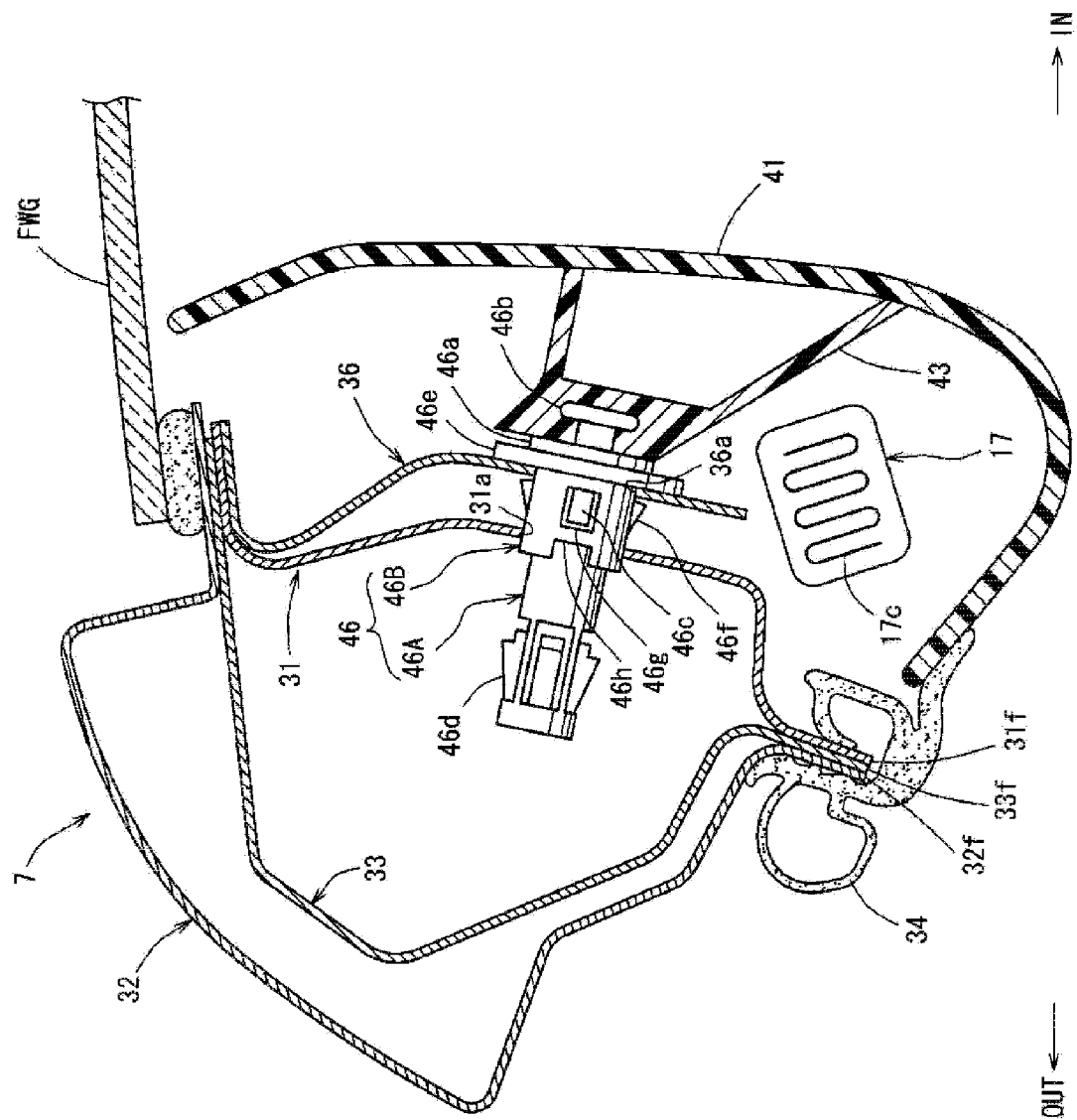

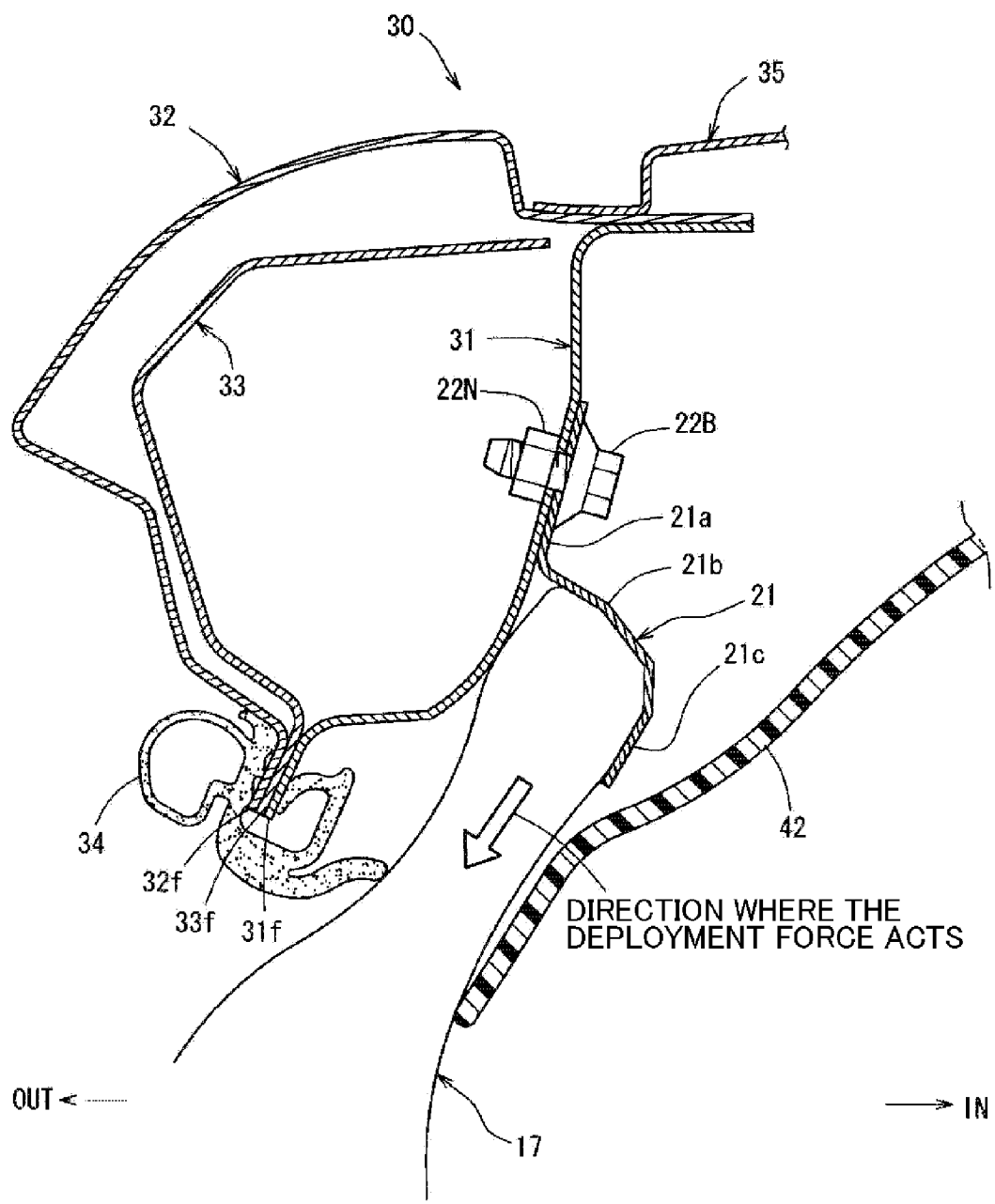
[Fig. 8]

[Fig. 9]
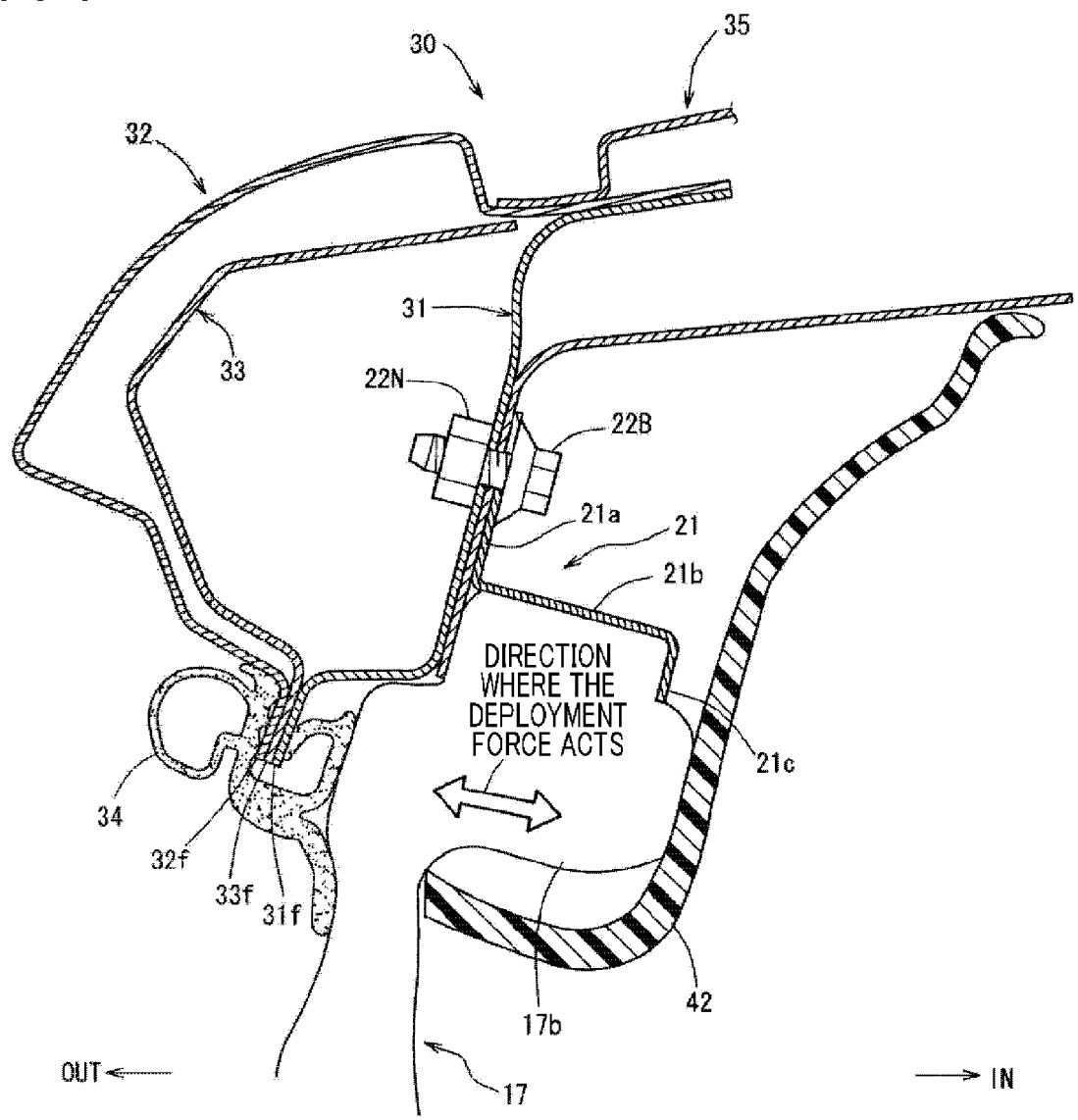

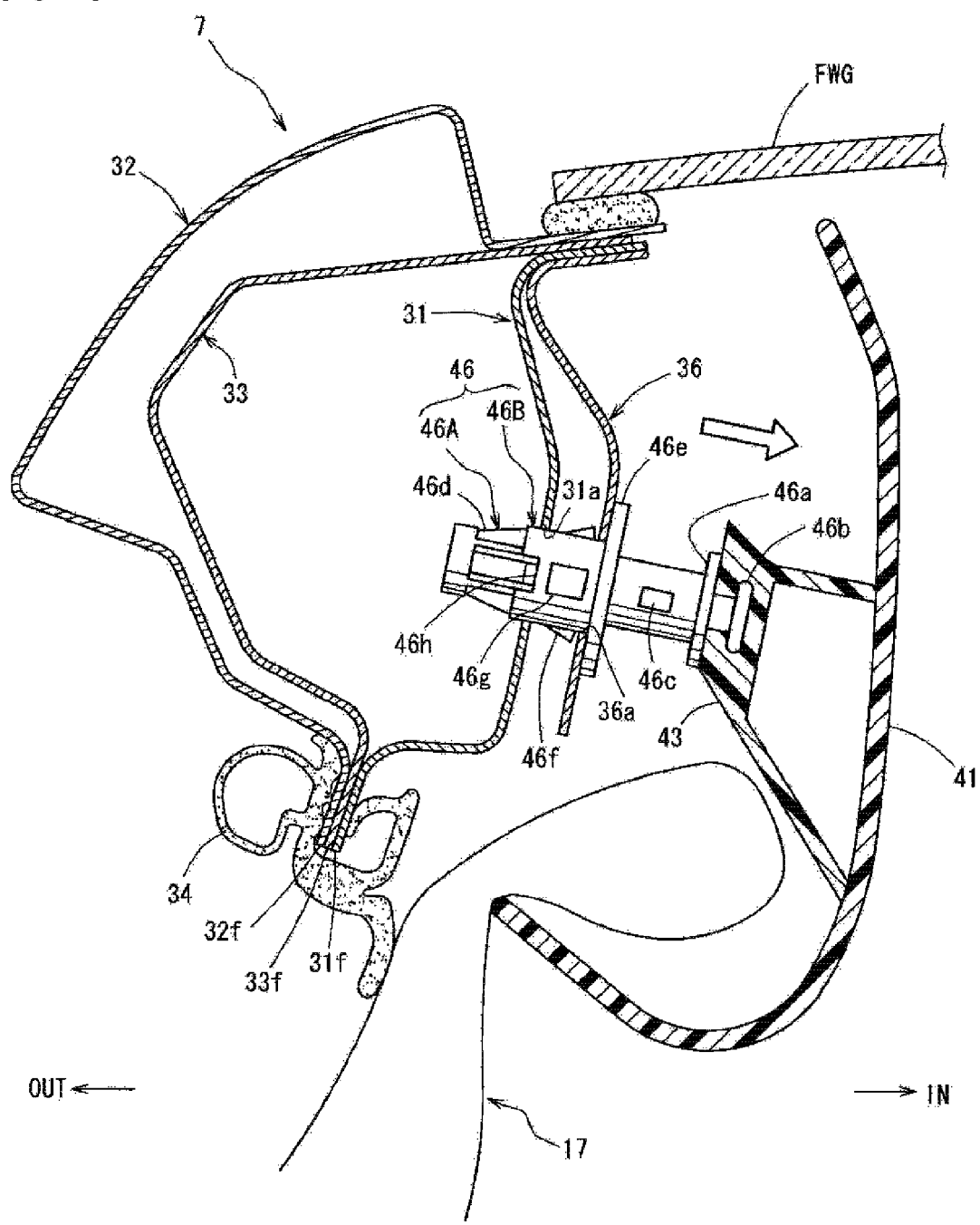
[Fig. 10]

[Fig. 11]
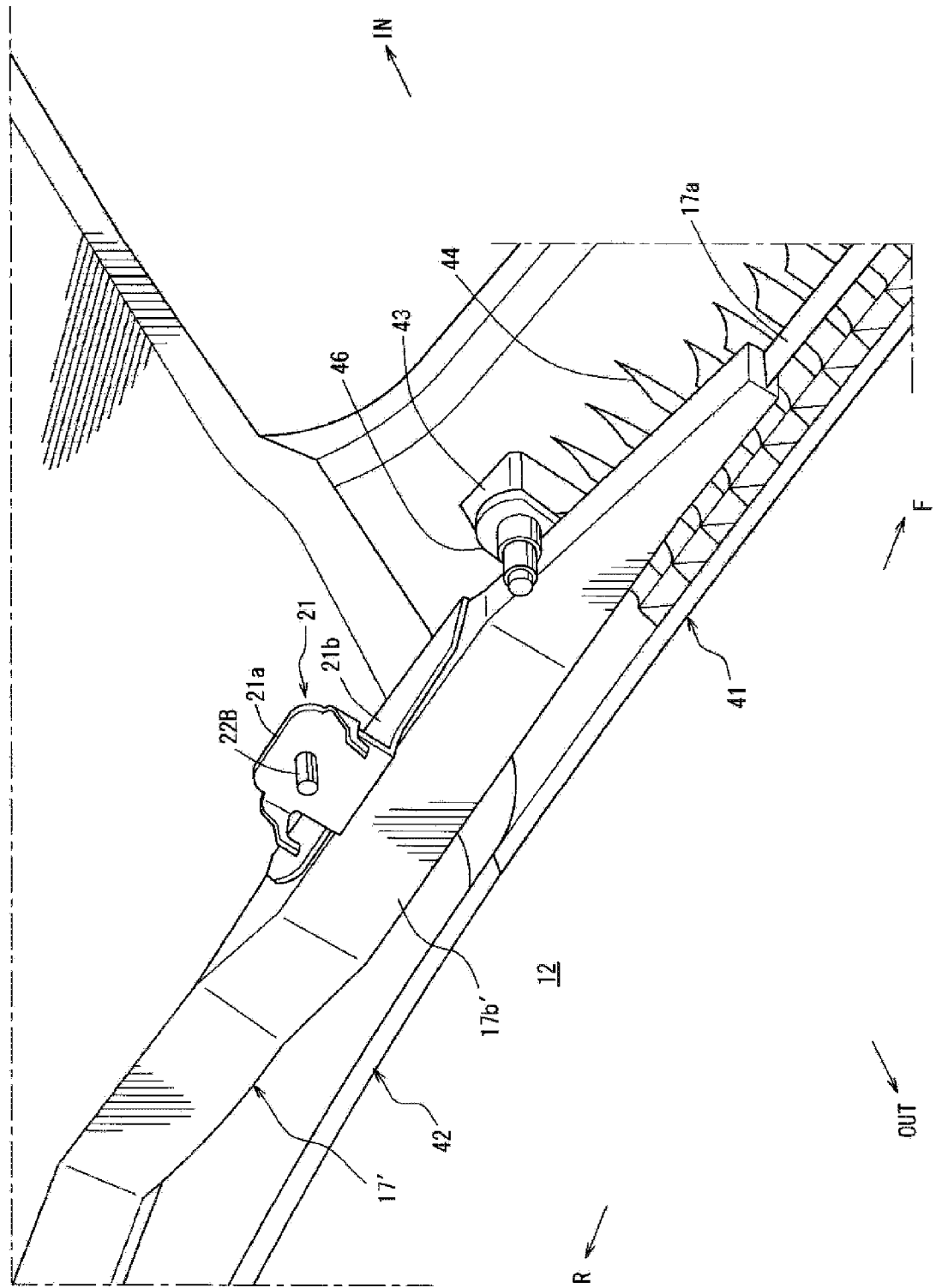

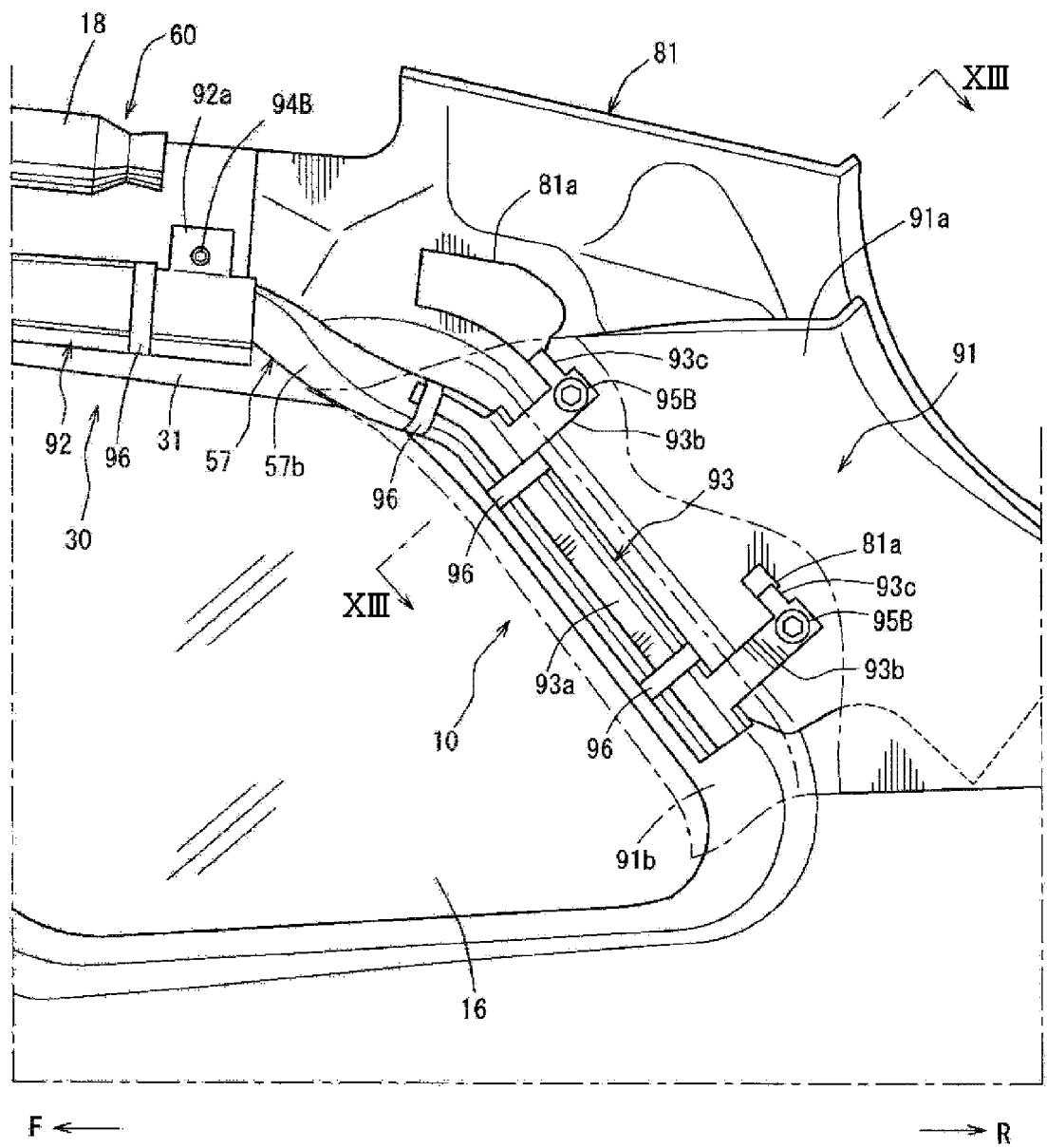
[Fig. 12]

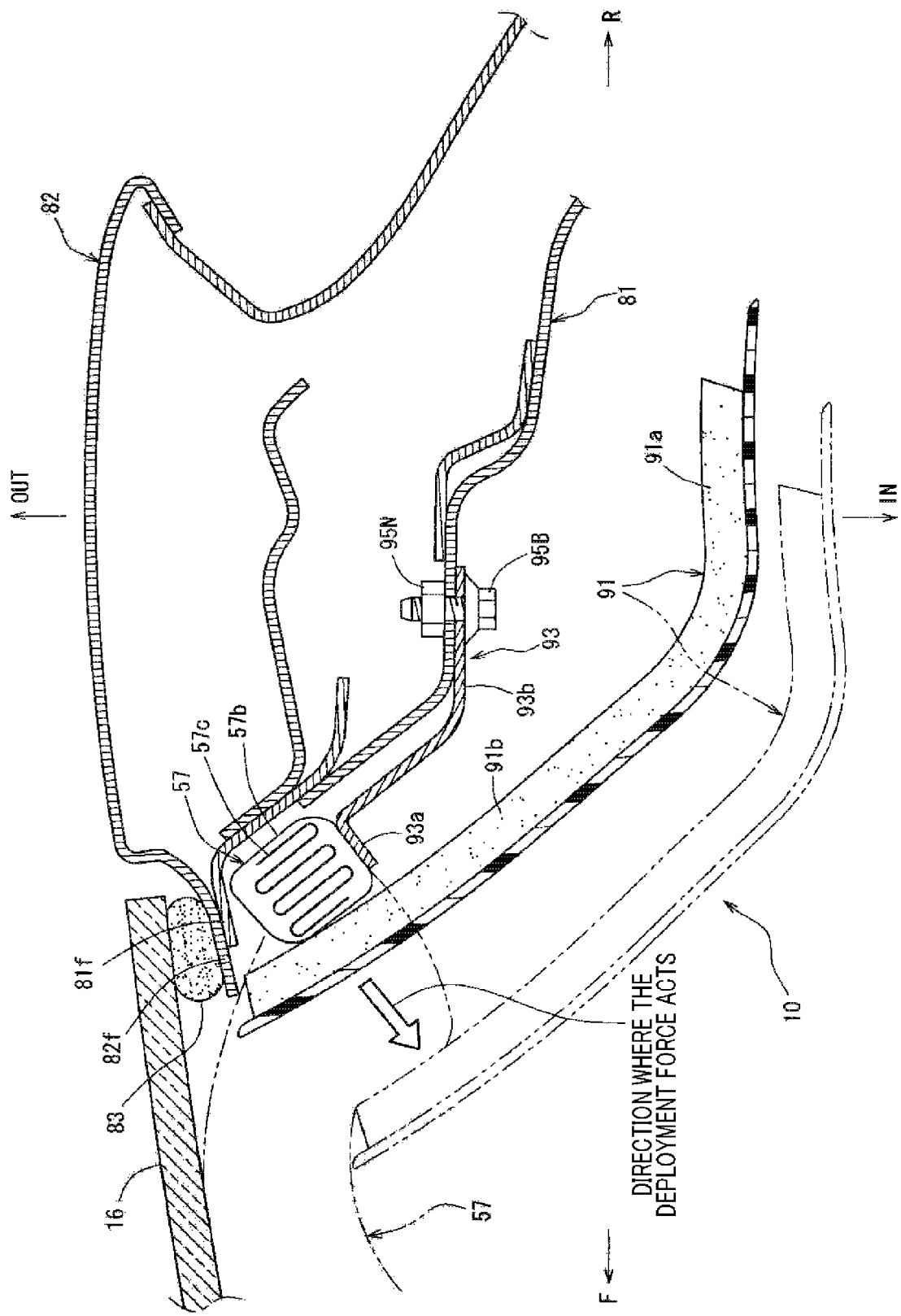
[Fig. 13]

CURTAIN AIRBAG DEVICE FOR VEHICLE

TECHNICAL FIELD

The present invention relates to a curtain airbag for a vehicle, which has a curtain airbag main body folded in a front or rear pillar part and a roof side rail part of a vehicle body so as to be able to deploy downward in a cabin while covered with a pillar trim and roof trim.

BACKGROUND ART

As disclosed in Japanese Patent No. 3498264, a conventional vehicle is equipped with an airbag device for protecting the occupants from load of frontal impacts, and is also sometimes equipped with a curtain airbag device for protecting the occupants from load of side impacts.

The main body of such a curtain airbag device is disposed in a folded manner in the inside of a cabin, along front and rear pillar parts from a roof side rail part of the vehicle body. The main body is inflated by being supplied with gas from an inflator when load of a side impact acts on the vehicle body, and then deploys along the window glasses and pillar inner surfaces.

In this structure, the curtain airbag device on the inside of the cabin is generally provided with a roof trim that covers the roof side rail part and a roof panel, as well as pillar trims that cover the front and rear pillar parts. In this case, a deployment force, generated upon inflation and deployment of the curtain airbag main body, causes the curtain airbag main body to push out the side edge parts of the roof trim and the side edge parts of the pillar trims continuing to the aforementioned side edge parts.

Incidentally, generally a pillar trim is formed of relatively hard resin, while a roof trim is formed of soft resin. However, because of these materials, the following problems might occur upon airbag deployment at an adjacent part between the roof trim and the pillar trim. In other words, since the roof trim is soft, when the roof trim is deformed as the side edge parts thereof are easily pushed out widely downward by the deployment force of the curtain airbag main body being deployed, the pillar trim, although hard, is also deformed at the adjacent part between the pillar trim and the roof trim as the side edge parts of the pillar trim are similarly pushed out widely by the force of the deployment, which might result in damage to the pillar trim.

Japanese Patent No. 3498264 discloses the curtain airbag device in which the curtain airbag main body is folded in the shape of an accordion, the direction of deployment of the airbag is set to a direction of pushing open the roof trim (lid) above the pillar parts (meaning that a gap is formed by moving the roof trim in a separation direction of parting the roof trim away from the roof side rail part) so that the curtain airbag main body is supported while having it partially twisted.

According to Japanese Patent No. 3498264 described above, such a structure is capable of strengthening the force of pushing open the roof trim, the force being generated upon inflation of the curtain airbag main body. This allows the roof trim to be deformed by pushing open a lower end thereof readily. As a result, the pillar parts of the airbag main body can be deployed quickly.

However, this conventional technology disclosed in Japanese Patent No. 3498264 is not designed to prevent damage to the soft pillar trim which is caused by pushing open the hard pillar trim, as it is designed to merely facilitate the deformation of the roof trim by improving the force to push open the roof trim with use of the original softness of the roof trim.

CITATION LIST

Patent Literature

PTL 1: Japanese Patent No. 3498264

SUMMARY OF INVENTION

An object of the present invention is to provide a curtain airbag device for a vehicle, which is capable of stably deploying a curtain airbag main body upon inflation and deployment thereof without damaging a pillar trim.

A curtain airbag device for a vehicle according to the present invention has a curtain airbag main body (17) that is disposed along a longitudinal direction of a vehicle body while covered with a pillar trim (41) and a roof trim (42), and folded in a front or rear pillar part (7, 10) and a roof side rail part (30) of the vehicle body so as to be able to deploy downward within a cabin, wherein the curtain airbag main body (17) is provided with a twisted part (17b, 57b) that is twisted such that an initial deployment force, generated upon inflation and deployment of the curtain airbag main body (17) located in a vicinity of the pillar trim (41), is acted in a separation direction in which the pillar trim (41) is parted away from the pillar part (7, 10), to push open the pillar trim (41) toward an inside of the cabin, and a regulating member for regulating at least an upward movement of the twisted part is provided on, at least, an upper surface of the twisted part (17b, 57b), the regulating member (21b) being disposed on a vehicle body side.

According to this structure, the initial deployment force that is generated upon inflation and deployment of the curtain airbag main body can be acted in the separation direction in which the pillar trip is parted away from the pillar part. Thus, the hard pillar trim can be pushed open toward the inside of the cabin without causing a significant local deformation of the pillar trim. As a result, a gap can be easily formed between the pillar part and the pillar trim.

Consequently, stable deployment of the curtain airbag main body can be achieved without damaging the pillar trim.

BRIEF DESCRIPTION OF DRAWINGS

FIG. 1 is a simple side cross-sectional view in which a curtain airbag main body and seats according to an embodiment of the present invention are viewed from the inside of cabin, the view showing a state in which the curtain airbag main body is stored;

FIG. 2 is a diagram corresponding to FIG. 1, showing a state after the curtain airbag main body is inflated and deployed inside a cabin;

FIG. 3 is a perspective view in which an adjacent part between a roof side rail part and an A pillar and the periphery of the adjacent part are viewed from the outside and front of the vehicle, wherein an inner panel and outer panel are removed;

FIG. 4 is a cross-sectional view taken along line IV-IV of FIG. 3;

FIG. 5 is an enlarged diagram showing the substantial parts of FIG. 3;

FIG. 6 is a cross-sectional view taken along line VI-VI of FIG. 5;

FIG. 7 is a cross-sectional view taken along line VII-VII of FIG. 5;

FIG. 8 is a diagram corresponding to FIG. 4, showing a state in which the curtain airbag main body is deployed;

FIG. 9 is a diagram corresponding to FIG. 6, showing a state in which the curtain airbag main body is deployed;

FIG. 10 is a diagram corresponding to FIG. 7, showing a state in which the curtain airbag main body is deployed;

FIG. 11 is a substantial perspective view in which an adjacent part between a roof side rail part and A pillar according to another embodiment of the present invention and the periphery of the adjacent part are viewed from the outside and front of the vehicle;

FIG. 12 is a side view in which a curtain airbag main body and D pillar according to yet another embodiment of the present invention are viewed from the inside of the cabin; and FIG. 13 is a cross-sectional view taken along a XIII-XIII line of FIG. 12.

DESCRIPTION OF EMBODIMENTS

Embodiments of the present invention are now described hereinafter with reference to the drawings.

FIG. 1 is a simple side cross-sectional view in which a curtain airbag main body 17 and seats 2, 3, 4 according to an embodiment of the present invention are viewed from the inside of cabin, the view showing a state in which the curtain airbag main body 17 is stored. FIG. 2 is a diagram corresponding to FIG. 1, showing a state after the curtain airbag main body 17 is inflated and deployed. As shown in FIG. 1, a vehicle 1 has the front seat 2, the second-row seat 3 disposed behind the front seat 2, and a third-row seat 4 disposed behind the second-row seat 3.

This vehicle 1 also has a side door 5 for the front seat 2, a side door 6 for the second-row seat 3, both side doors being used by occupants to board and unboard the vehicle 1, a front A pillar 7 (front pillar), B pillar 8 and C pillar 9 in order from the front, and a D pillar 10 as a rear pillar. Note that the arrow (F) in each of the diagrams represents the front of the vehicle body, and the arrow (R) the rear of the vehicle body.

The side door 5 for opening and closing a boarding/unboarding opening 11 between the A pillar 7 and the B pillar 8 has a side window glass 12 that is driven to be opened or closed in a vertical direction. The side door 6 for opening and closing a boarding/unboarding opening 13 between the B pillar 8 and the C pillar 9 has a side window glass 14 that is driven to be opened or closed in the vertical direction. Between the C pillar 9 and the D pillar 10 is provided a rear side opening 15, which is covered with a side window glass 16.

This vehicle 1 is provided with the curtain airbag main body 17 (abbreviated as "airbag main body 17" hereinafter), which covers, from the inside of the cabin, a vehicle body side inner surface including the three side window glasses 12, 14, 16, at the time of a side impact or upon prediction thereof, as well as at the time of a tip-over or upon prediction thereof. An inflator 18 for supplying gas pressure for causing the inflation and deployment to the airbag main body 17 via a supply path 19 is provided above and in front of the C pillar 9. In the present embodiment, the airbag main body 17, the inflator 18, the supply path 19 and the like constitute a curtain airbag device 20.

In an internal space from the A pillar 7 through a roof side rail part 30 to the D pillar 10, the airbag main body 17 is folded into an accordion shape and stored in the form of a single rod. The airbag main body 17 is then fixed to the vehicle body by a supporting bracket 21 and the like, which are described hereinafter. Upon inflation and deployment, the airbag main body 17 is deployed downward in the inside of the cabin along inner side surfaces of the side window glasses 12, 14, 16, to cover these side window glasses 12, 14, 16 from the inner side of the cabin, as shown in FIG. 2. Furthermore, the size of the airbag main body 17 is set such that a lower end thereof is positioned slightly below a lower edge part of each of the side window glasses 12, 14, 16 when the airbag main body 17 is deployed.

FIG. 3 is a perspective view in which an adjacent part between the roof side rail part 30 and the A pillar 7 and the periphery of the adjacent part are viewed from the outside and front of the vehicle, wherein an inner panel 31 and outer panel 32 are removed. Note in the diagram that the arrow (IN) represents a direction toward the inside of the vehicle body, and the arrow (OUT) represents a direction toward the outside of the vehicle body. As shown in FIGS. 1 to 3, an upper edge part of the airbag main body 17 is provided with a plurality of the supporting brackets 21, 21, . . . , along upper edges of the side window glasses 12, 14, 16. A front end part of the airbag main body 17 is provided with a tether 17a that is fixed to a lower part of the A pillar 7.

Moreover, each of the pillars 7 to 10 is covered with a pillar trim from the inside of the cabin. For instance, the A pillar 7 is covered with an A pillar trim 41 shown in FIG. 3.

The inner side of the roof side rail part 30 is covered with a roof trim 42. The roof trim 42 is formed of a material obtained by covering the surface of an elastic body or other soft material such as urethane foam with a nonwoven fabric. The roof trim 42 is plastically and elastically deformed relatively easily by external force of finger pressure. Each of the pillar trims including the A pillar trim 41, harder than the roof trim 42, is formed of hard synthetic resin such as polypropylene, and therefore cannot be plastically deformed easily by external force of finger pressure.

FIG. 4 is a cross-sectional view taken along line IV-IV of FIG. 3. A side surface part of the vehicle body has the inner panel 31 configuring the inner surface thereof, the outer panel 32 configuring an outer surface of the same, and a reinforcement panel 33 that is described hereinafter. The panels 31 and 32 are each provided with openings corresponding to the boarding/unboarding openings 11 and 13 and the side window 15. Flanges 31f, 32f, 33f that are formed in opening edge parts of the boarding/unboarding openings 11 and 13 are joined to one another, as shown in FIG. 4. A weather strip 34 is fixed to the joint part of these flanges 31f, 32f, 33f.

A section above the openings 11, 13, 15 of the inner panel 31 and the outer panel 32 constitutes the roof side rail part 30. The roof side rail part 30 is formed as a closed cross-sectional body in which upper and lower ends thereof are joined to each other by the inner panel 31 and the outer panel 32 at each of the pillars 7, 8, 9 and 10, as shown in FIG. 4. The reinforcement panel 33 for reinforcing the roof side rail part 30 is provided within a space extending in a longitudinal direction of the roof side rail part 30. A side end part of a roof panel 35 that configures an outer surface of the ceiling of the vehicle body is joined to an end part on the inside in a vehicle width direction of the outer panel 32.

In the roof side rail part 30, the airbag main body 17 is supported by the supporting brackets 21, and a plurality of adhesive tapes (not shown), disposed at intervals in the longitudinal direction, are wrapped around an outer circumference of the airbag main body 17 to tape the airbag main body 17. In this manner, the airbag main body 17 is stored in the form of a substantially straight line in the substantially longitudinal direction in a planar view.

In this case, each of the supporting brackets 21 is fixed to the inner panel 31 by fastening members such as a bolt 22B and nut 22N, as shown in FIG. 4. Accordingly, the airbag main body 17 is supported on the inner panel 31 by the supporting brackets 21.

Furthermore, in the roof side rail part 30 except for the area near a front end part of the roof side rail part 30, the airbag main body 17 is folded such that a direction where respective folded portions of the airbag main body 17 are superposed on each other (a direction where the thickness of the airbag increases as a result of folding and superposing the airbag) follows the substantially vertical direction, as shown in FIG. 4.

On the other hand, at the front end part of the roof side rail part 30, that is, in the area in the vicinity of the adjacent part between the roof side rail part 30 and the A pillar 7, the airbag main body 17 is provided with a twisted part 17b shown in FIGS. 3 and 5. In this case, while a tip end part 17c of the airbag main body 17 is held at the lower end part in a section other than the twisted part 17b as shown in FIG. 4, the tip end part 17c is held twisted in the twisted part 17b so as to be placed toward the outer side, as shown in FIG. 6. In this twisted part 17b, the airbag main body 17 is folded such that the direction where respective folded portions of the airbag are superposed on each other follows the substantially vehicle width direction, as shown in FIG. 6. Note that FIG. 5 is an enlarged diagram showing the substantial parts of FIG. 3, and FIG. 6 a cross-sectional view taken along line VI-VI of FIG. 5.

In the position corresponding to the twisted part 17b, as shown in FIG. 6, the supporting bracket 21 supporting the twisted part 17b is fastened and fixed by the bolt 22B and the nut 22N to the inner panel 31 and to a plate-like reinforcement member 36 located further inside the cabin from the inner panel 31.

Here, as shown in FIGS. 4 to 6, the supporting bracket 21 has an upper regulating part 21b that extends from a fixed part 21a fixed to the inner panel 31 (the reinforcement panel 36) toward the inside of the cabin, and a side regulating part 21c that extends downward from an end part of the upper regulating part 21b on the inside of the cabin. These upper regulating part 21b and side regulating part 21c regulate an upper surface of the airbag main body 17 and a side surface part of an upper part inside the cabin.

The side regulating part 21c is disposed in the vicinity of the roof trim 42. This prevents the roof trim 42 from being displaced to the outer side even when an occupant presses the roof trim 42 from the inside of the cabin.

Next, the structure of the A pillar trim 41 is described with reference to FIGS. 3, 5 and 7. FIG. 7 is a cross-sectional view taken along line VII-VII of FIG. 5. As shown in FIG. 3, a plurality of attachment seats 41a, 41b that project to the outer side are integrally molded on the back surface side or the outer side of the A pillar trim 41. On the other hand, another attachment seat 43 shown in FIGS. 3, 5 and 7 is disposed in the vicinity of a rear end part.

In addition, a resin impact absorption part 44 configured by a plurality of ribs is disposed on the back surface side of the A pillar trim 41. A member FWG shown in FIG. 7 is a front window glass, which is omitted in FIGS. 3 and 5 for the sake of convenience.

The attachment seats 41a, 41b, 43 are attached with clip members 45, 45, 46 ("attachment members" in the claims) that project to somewhat aim the outside in the vehicle width direction. These clip members 45, 45, 46 are fitted into the inner panel 31 and the reinforcement member 36, thereby attaching the A pillar trim 41 to the A pillar 7.

The clip member 46 has the structure similar to the one disclosed in, for example, Japanese Patent Application Publication No. 2002-37007. In other words, the clip member 46 is configured by, as shown in FIG. 7, a pin member 46A that is attached to the attachment seat 43 fixed to the back surface side of the A pillar trim 41, and a cylindrical grommet member 46B attached to the inner panel 31 and reinforcement member 36.

The pin member 46A, although inserted to the grommet member 46B, is retained at a two-step insertion depth position. FIG. 7 illustrates a first state in which the pin member 46A is inserted deeply to the grommet member 46B. This first state is a predetermined attachment state in which the A pillar trim 41 is in proximity to the inner panel 31 and the reinforcement member 36.

The pin member 46A enters the attachment state by sandwiching the attachment seat 43 between first and second flange parts 46a and 46b. A first locking click 46c and second locking click 46d are formed at a leg part of the pin member 46A. The first locking click 46c is positioned in the vicinity of the first flange part 46a, whereas the second locking click 46d is positioned in the vicinity of a tip end part of the leg part. A plurality of the locking clicks 46c and 46d are formed in a circumferential direction of the leg part. In a free state where no external force is applied, the locking clicks project outward in a radial direction from an outer circumferential surface of an outer wall part and are capable of deforming elastically in the radial direction of the leg part.

On the other hand, the grommet member 46B is configured by a flange part 46e formed at a base end part of the cylinder part, an attachment locking click 46f formed in a side surface of the cylinder part, and an opening part 46g and engagement part 46h that are described hereinafter. The attachment locking click 46f slightly projects outward in a radial direction of the cylinder part from an outer circumferential surface of the cylinder part and is capable of deforming elastically in the radial direction of the cylinder part. A plurality of such attachment locking clicks 46f are provided at substantially regular intervals in a circumferential direction of the cylinder part.

In the present embodiment, the cylinder part of the grommet member 46B is attached by being inserted into attachment holes 31a and 36a of the inner panel 31 and the reinforcement member 36 respectively, wherein the reinforcement member 36 is sandwiched between the attachment locking click 46f and the flange part 46e, as shown in FIG. 7.

In the first state shown in FIG. 7 in which the leg part of the pin member 46A is inserted deeply into the cylinder part of the grommet member 46B, the first locking click 46c is positioned in the opening part 46g in the side surface of the grommet member 46B and is engaged with an edge part of the opening part 46g, whereby the second locking click 46d is positioned as being inserted deeply.

Incidentally, according to the present embodiment, although the airbag main body 17 is twisted in the twisted part 17b located in the adjacent part between the roof trim 42 and the A pillar trim 41, the part of the airbag main body 17 that is close to the tether 17a in front of the A pillar trim 41 (see FIGS. 1 and 3) is twisted in the opposite direction. In other words, the airbag main body 17 is twisted in a direction where the tip end part 17c thereof returns to the lower end part, as shown in FIG. 7.

Deployment operations of the airbag main body 17 are described next. In the present embodiment, upon meeting the conditions where a side impact or a vehicle tip-over is detected or predicted while the airbag main body 17 is stored, the inflator 18 is initiated. The gas pressure generated by the initiation of the inflator 18 is supplied to the airbag main body 17 via the supply path 19. As a result, the airbag main body 17 is inflated and deployed downward in the inside of the cabin, as shown in FIG. 2.

In this case, the deployment force of the airbag main body 17 acts downward as shown mainly by the thick arrow in FIG. 8, because, in the section of the roof side rail part 30 where no pillars are present, the airbag main body 17 is folded such that the direction where respective folded portions of the airbag main body 17 are superposed on each other follows the substantially vertical direction. The downward inflation and deployment of the airbag main body 17 within of the cabin is performed by detaching a side edge part of the roof trim 42 from the weather strip 34 and deforming the roof trim 42 by pushing it out downward and toward the inside of the cabin, as illustrated in the diagram. Note that the roof trim 42 is soft as described above and therefore can be deformed easily.

On the other hand, in the vicinity of the adjacent part between the roof side rail part 30 and the A pillar 7, the airbag main body 17 is folded such that the direction where respective folded portions of the airbag main body 17 are superposed on each other follows the substantially vehicle width direction at the twisted part 17b. Thus, on the roof side rail part 30 side, the deployment force of the airbag main body 17 acts in the vehicle width direction shown mainly by the thick arrow in the diagram, that is, in this case, the separation direction where the roof trim 42 is parted away from the roof side rail part 30, while the upper regulating part 21b and side regulating part 21c of the supporting bracket 21 regulate the positions of the upper surface of the airbag main body 17 and the side surface part of the upper part inside the cabin, as shown in FIG. 9.

Therefore, the downward inflation and deployment of the airbag main body 17 within the cabin is performed by detaching the side edge part of the roof trim 42 from a groove of the weather strip 34 and pushing the roof trim 42 out toward the inside of the cabin while deforming the roof trim 42.

In so doing, on the A pillar 7 side in the vicinity of the adjacent part, the deployment force of the airbag main body 17 in the vehicle width direction pushes open the hard A pillar trim 41 without causing much deformation thereof, in the direction toward the inside of the cabin, which is the separation direction where the A pillar trim 41 is parted away from the A pillar 7. Thus, the downward inflation and deployment of the airbag main body 17 within the cabin is performed by detaching a side edge part of the A pillar trim 41 from the groove of the weather strip 34 and pushing open the A pillar trim 41 toward the inside of the cabin.

In addition, in the section corresponding to the A pillar 7, the deployment force for pushing open the A pillar trim 41 toward the inside of the cabin causes external force to act on the clip member 46 in a direction in which the pin member 46A slips out of the grommet member 46B, as shown by the thick arrow in FIG. 10. Action of such external force releases the engagement between the first locking click 46c and the edge part of the opening part 46g, while allowing a new engagement between the second locking click 46d and the engagement part 46h formed at the tip end of the grommet member 46B. This results in a second state in which the pin member 46A is shallowly inserted into the grommet member 46B.

In this second state, as the A pillar trim 41 is parted away from the inner panel 31 and the reinforcement member 36, the A pillar trim 41 is entirely pushed open toward the inside of the cabin, without causing much deformation of the A pillar trim 41 itself. Then, the side edge part of the A pillar trim 41 is detached from the groove of the weather strip 34, thereby forming a gap therebetween. Therefore, the downward inflation and deployment of the airbag main body 17 within the cabin is performed throughout the gap that is formed by pushing open the A pillar trim 41.

As described above, in the present embodiment, provision of the twisted part 17b to the airbag main body 17 positioned in the vicinity of the A pillar trim 41 can allow the initial deployment force, which is generated upon inflation and deployment of the airbag main body 17, to act in the separation direction where the A pillar trim 41 is parted away from the A pillar 7. For this reason, the hard A pillar trim 41 can be pushed open toward the inside of the cabin without deforming the A pillar trim 41, and the gap can be easily formed between the A pillar 7 and the A pillar trim 41. Consequently, stable deployment of the airbag main body 17 can be achieved without damaging the A pillar trim 41.

Also, in the twisted part 17b the direction in which the airbag main body 17 is folded into an accordion and superpositions is set to the abovementioned separation direction, so that the A pillar trim 41 can be pushed open reliably. Consequently, the effects of preventing damage to the A pillar trim 41 and stabilizing the deployment of the airbag main body 17 can be achieved reliably.

By positioning the tip end part 17c of the airbag main body 17 toward the outer side in the twisted part 17b, the tip end part 17c can be disposed in the vicinity of the gap that is formed upon inflation and deployment of the airbag main body. For this reason, the downward deployment from the gap toward the inside of the cabin can be performed smoothly.

In addition, because the supporting bracket 21 is provided with the upper regulating part 21b and the side regulating part 21c, the direction of the deployment of the airbag main body 17 can be appropriately controlled, and the downward deployment toward the inside of the cabin can be achieved reliably, while acting the initial deployment fore in the separation direction upon inflation and deployment.

Furthermore, the clip member 46 supports the A pillar trim 41 such that the A pillar trim 41 can move relative to the A pillar 7 in the direction where the A pillar trim 41 is pushed open toward the inside of the cabin by the initial deployment power generated upon inflation and deployment. Thus, the A pillar trim 41 can appropriately be pushed open with a good responsiveness by means of the initial deployment force generated upon inflation and deployment, and the airbag main body 17 can be deployed more stably.

Incidentally, immediately after the inflator 18 starts supplying the gas, the section corresponding to the roof side rail part 30 that is behind the A pillar 7 inflates first, and then the inflation expands toward the A pillar 7 in front. Thus, a lower part of the section of the airbag main body 17 that corresponds to the A pillar 7 is pulled downward by the rear section that has already inflated.

Therefore, according to the present embodiment in which the roof side rail part 30 is provided with the inflator 18, at a rear end part of the A pillar 7 positioned in the adjacent part between the roof side rail part 30 and the A pillar 7, the A pillar trim 41 needs to be pushed open faster than any other sections of the A pillar 7.

In the present embodiment, because the twisted part 17b is provided in the position corresponding to the adjacent part, the deployment force in the separation direction can be acted on the adjacent part faster than on any other sections. As a result, the downward deployment of the airbag main body 17 within the cabin can be carried out smoothly.

On the other hand, the part of the airbag main body 17 that is close to the tether 17a in front of the A pillar trim 41 is twisted in the direction where the tip end part 17c thereof returns to the lower end part. As a result, the downward deployment of the airbag main body 17 within the cabin can be facilitated at the section corresponding to the A pillar 7.

Note that the present invention is not necessarily limited to the above-described embodiment in which the twisted part 17b is provided at the position corresponding to the adjacent part between the roof side rail part 30 and the A pillar 7. For example, as in an airbag main body 17' shown in FIG. 11, a twisted part 17b' thereof may be provided at further forward and in the vicinity of the clip member 46 as shown in the diagram.

In this case, since the initial deployment force, generated upon inflation and deployment, can be acted on the clip member 46 reliably and quickly, the A pillar trim 41 can be pushed open with a good responsiveness during the initial stage of the inflation and deployment, whereby the stability of the deployment of the airbag main body 17 can be further improved. Note in FIG. 11 that the same reference numerals are applied to the components same as those of the first embodiment shown in FIGS. 1 to 10, and the overlapping description is omitted.

In addition, the present invention is not necessarily limited to the case where the twisted part 17b is provided in the vicinity of the A pillar 7 on the front side of the vehicle 1. For example, as in an airbag main body 57 of a curtain airbag device 60 shown in FIGS. 12 and 13, a twisted part 57b may be provided in the vicinity of the D pillar 10 on the rear side of the vehicle. Note in FIGS. 12 and 13 that the same reference numerals are applied to the components same as those of the first embodiment shown in FIGS. 1 to 10, and the overlapping description is omitted.

The D pillar 10 is formed into a closed cross section by an inner panel 81 and outer panel 82 shown in FIGS. 12 and 13. Short flange parts 81f, 82f that extend forward are formed at a front end part of the D pillar 10, as shown in FIG. 13. A rear end part of the side window glass 16 is fixed to an outer surface of the flange parts 82f by an adhesive 83.

A D pillar trim 91 covering the D pillar 10 has a substantially L-shaped cross section in the substantially horizontal direction, as shown in FIG. 13. The D pillar trim 91 has a side surface part 91a extending widely in the longitudinal direction, and a front surface part 91b that extends outward and widely in the vehicle width direction from a front end of the side surface part 91a. A side edge part on the outer side of the front surface part 91b, positioned proximal to a rear edge part of the side window glass 16, is stretched out to the vicinity of the flange parts 81f, 82f.

In the curtain airbag device 60, the stored airbag main body 57 is supported in the vehicle body by supporting brackets 92, 93 and the like in the vicinity of the D pillar 10. The supporting bracket 92 shown in FIG. 12 is attached to the roof side rail part 30, whereas the supporting bracket 93 shown in FIGS. 12 and 13 is attached to the D pillar 10. The stored airbag main body 57 is supported by these supporting brackets 92, 93, from the upper edge part to rear edge part of the side window glass 16.

The supporting bracket 92 has a substantially reversed C-shaped cross section as viewed from the front, so as to be able to cover the stored airbag main body 57 from the inside of the cabin. An attachment part 92a, formed in a part of the supporting bracket 92, is fastened to the inner panel 31 of the roof side rail part 30 by fastening members such as a bolt 94B and nut (not shown), and is then fixed to a predetermined position.

The supporting bracket 93, on the other hand, is a plate-like member for regulating the position of the stored airbag main body 57 on the inside of the cabin. A regulating member 93a for regulating the position of the airbag main body 57 on the inside of the cabin is formed on the outer side.

Upper and lower attaching parts 93b are formed in the supporting bracket 93. An engagement click 93c is formed in each of the attaching parts 93b. The supporting bracket 93 is fixed in a predetermined position by forming an engagement between the engagement click 93c and an edge part of an engagement hole 81a formed in the inner panel 81 of the D pillar 10, and fastening each attaching part 93b to the inner panel 81 using bolts 95B, 95N and other fastening members.

Adhesive tapes 96, 96, . . . , are wrapped around an outer circumference of the airbag main body 57 in relation to the positions of the supporting brackets 92 and 93, to keep the airbag main body 57 stored.

In the embodiment shown in FIGS. 12 and 13, the airbag main body 57 is provided with the twisted part 57b in the vicinity of the D pillar 10. The airbag main body 57 is held twisted in this twisted part 57b so that a tip end part 57c of the airbag main body 57 that is positioned in the lower end part of the airbag main body 57 in other sections is then positioned on the outer side. At this twisted part 57b, as shown in FIG. 13, the airbag main body 57 is folded such that the direction where respective portions of the airbag main body 57 are superposed on each other is directed substantially forward and to the inside of the cabin.

In the present embodiment, the direction where respective folded portions of the airbag main body 57 are superposed on each other at the twisted part 57b is directed substantially forward and to the inside of the cabin as described above. Therefore, when the airbag main body 57 is inflated and deployed, the adjacent part and the D pillar 10 on the inside of the cabin are partially regulated by the regulating part 93a of the supporting bracket 93 as shown in FIG. 13, and at the same time the deployment force of the airbag main body 57 acts mainly in the forward direction of the vehicle or the direction directed to the inside of the cabin, which is, in other words, the separation direction where the D pillar trim 91 is parted away from the D pillar 10.

In this case, the hard D pillar trim 91 is pushed open, without being deformed much, toward the separation direction where it is parted away from the D pillar 10. For this reason, the downward inflation and deployment of the airbag main body 57 within the cabin is performed by parting a side edge part of the D pillar trim 91 on the outer side away from the flange parts 81f and 82f of the inner panel and outer panel 81 and 82 of the D pillar 10, to push open the D pillar trim 91 towards the inside of the cabin, as shown by the two-dot chain line in FIG. 13.

In the present embodiment as described above, since the twisted part 57b is provided in the airbag main body 57 located in the vicinity of the D pillar trim 91, the initial deployment force that is generated upon inflation and deployment of the airbag main body 57 can be acted in the separation direction where the D pillar trim 91 is parted away from the D pillar 10. Thus, the hard D pillar trim 91 can be pushed open toward the inside of the cabin without deforming the D pillar trim 91, and the gap can be easily formed between the D pillar 10 and the D pillar trim 91. As a result, stable deployment of the airbag main body 57 can be achieved without damaging the D pillar trim 91.

In the correspondence relation between the structure of the present invention and the embodiments described above, the front pillar corresponds to the A pillar 7, the rear pillar to the D pillar 10, the regulating members to the supporting brackets 21 and 93, and the attachment member to the clip member 46.

However, the present invention is not limited to the configurations of the embodiments described above, and many embodiments can be realized.

In summary, a curtain airbag device for a vehicle according to the present invention has a curtain airbag main body 17 that is disposed along a longitudinal direction of a vehicle body while covered with a pillar trim 41 and a roof trim 42, and folded in a front or rear pillar part 7, 10 and a roof side rail part 30 of the vehicle body so as to be able to deploy downward within a cabin, wherein the curtain airbag main body 17 is provided with a twisted part 17b, 57b that is twisted such that an initial deployment force, generated upon inflation and deployment of the curtain airbag main body 17 located in a vicinity of the pillar trim 41, is acted in a separation direction in which the pillar trim 41 is parted away from the pillar part 7, 10, to push open the pillar trim 41 toward an inside of the cabin, and a regulating member for regulating at least an upward movement of the twisted part is provided on, at least, an upper surface of the twisted part 17b, 57b, the regulating member 21b being disposed on a vehicle body side.

Note that the term "vicinity" in the above paragraph is meant such that the curtain airbag main body 17 is located either in the boundary region between the roof trim 42 and the pillar trim 41 or in the region of the roof trim 42 within 30 cm, preferably 20 cm, from the edge of the pillar trim 41.

According to this structure, the initial deployment force that is generated upon inflation and deployment of the curtain airbag main body can be acted in the separation direction in which the pillar trip is parted away from the pillar part. Thus, the hard pillar trim can be pushed open toward the inside of the cabin without causing a significant local deformation of the pillar trim. As a result, a gap can be easily formed between the pillar part and the pillar trim.

Consequently, stable deployment of the curtain airbag main body can be achieved without damaging the pillar trim.

In an embodiment of the present invention, the twisted part is provided with an accordion-shaped folded part that is folded such that a direction where respective folded portions of the curtain airbag main body are superposed on each other roughly follows the separation direction. The initial deployment force, generated upon inflation and deployment of the curtain airbag main body, is acted in the separation direction, to push open the pillar trim toward the inside of the cabin, and to deploy the curtain airbag main body downward from a gap between the pillar trim and the pillar part toward the inside of the cabin.

According to this configuration, because the pillar trim can be pushed open reliably, the effects of preventing damage to the pillar trim and stabilizing the deployment of the curtain airbag main body can be achieved reliably.

In an embodiment of the present invention, in the twisted part, a tip end part of the folded part is positioned toward an outside of the vehicle body.

According to this configuration, the tip end part of the curtain airbag main body can be disposed in the vicinity of the gap formed upon inflation and deployment. Thus, the curtain airbag main body can be smoothly deployed downward from the gap toward the inside of the cabin.

In an embodiment of the present invention, the regulating member has an upper regulating part for regulating an upper surface of the twisted part, and a side regulating part for regulating a side surface, at an upper part within the cabin, of the twisted part.

According to this configuration, the direction of the deployment of the curtain airbag can be controlled appropriately, and the downward deployment within the cabin can be achieved reliably, while the initial deployment fore, generated upon inflation and deployment, is acted in the separation direction.

In an embodiment according to the present invention, the pillar trim is attached to the pillar part by an attachment member and is supported by the pillar part so as to be able to move relative to the pillar part in a direction in which the pillar trim is pushed open toward the inside of the cabin by the initial deployment force generated upon inflation and deployment of the curtain airbag main body.

According to this configuration, the pillar trim can be pushed open with a good responsiveness by means of the initial deployment force generated upon inflation and deployment, whereby more stable deployment of the curtain airbag main body can be achieved.

In an embodiment of the present invention, the attachment member is disposed in a vicinity of the twisted part.

Note that the term "vicinity" in the above paragraph is meant such that the attachment member (46) is located either in the region of the twisted part (17b) or within 30 cm (or preferably within 20 cm) forward and rearward of the twisted part (17b) in the longitudinal direction.

According to this configuration, because the initial deployment force, generated upon inflation and deployment, can be acted on the attachment member reliably and quickly, the pillar trim can be pushed open with a good responsiveness during the initial stage of the inflation and deployment, and the stability of the deployment of the curtain airbag main body can be further improved.

In an embodiment of the present invention, the roof side rail part is provided with an inflator for supplying inflation and deployment gas to the airbag main body located in a section corresponding to the roof side rail part, and the twisted part is provided in a position corresponding to the adjacent part between the pillar part and the roof side rail part.

When the roof side rail part is provided with the inflator, the section corresponding to the roof side rail part inflates first immediately after the inflator starts supplying the gas, and then the inflation expands toward the pillar part. Therefore, in the section of the curtain airbag main body that corresponds to the pillar part, a lower part of this section is pulled downward by the section of the roof side rail part that has already inflated.

Thus, in the section of the pillar part that is located in the adjacent part between the roof side rail part and the pillar part, the pillar trim needs to be pushed open faster than any other sections of the pillar part.

According to this configuration, since the twisted part is provided in the position corresponding to the adjacent part, the deployment force in the separation direction can be acted on the adjacent part faster than on any other sections. Consequently, the downward deployment of the curtain airbag main body within the cabin can be performed smoothly.

According to the present invention, since the initial deployment force, generated upon inflation and deployment of the curtain airbag main body, can be acted in the separation direction where the pillar trim is parted away from the pillar part, the hard pillar trim can be pushed open by moving the pillar trim toward the inside of the cabin without causing a significant local deformation of the pillar trim, and the gap can be easily formed between the pillar part and the pillar trim.

Thus, stable deployment of the curtain airbag main body can be achieved without causing damage to the pillar trim.

This application is based on Japanese Patent Application Serial No. 2010-040229 filed in Japan Patent Office on Feb. 25, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be constructed as being included therein.

INDUSTRIAL APPLICABILITY

This invention can be applied to a curtain airbag device for a vehicle where said curtain airbag device has a curtain airbag main body 17 that is disposed along a longitudinal direction of a vehicle body while covered with an A pillar trim 41 and roof trim 42, and folded in an A pillar 7 and a roof side rail part 30 of the vehicle body so as to be able to deploy downward within a cabin.

The invention claimed is:

1. A curtain airbag device for a vehicle, comprising:
a curtain airbag main body that is disposed along a longitudinal direction of a vehicle body while covered with a pillar trim and a roof trim, and folded in a front or rear pillar part and a roof side rail part of the vehicle body so as to be able to deploy downward within a cabin, and
an attachment member which attaches the pillar trim to the pillar part;
wherein:
the curtain airbag main body is provided with a twisted part that is twisted such that an initial deployment force, generated upon inflation and deployment of the curtain airbag main body located in a vicinity of the pillar trim, is acted in a separation direction in which the pillar trim is parted away from the pillar part, to push open the pillar trim toward an inside of the cabin;
a regulating member for regulating at least an upward movement of the twisted part is provided on, at least, an upper surface of the twisted part, and the regulating member being disposed on a vehicle body side;
the twisted part is provided with an accordion-shaped folded part that is folded such that a direction where respective folded portions of the curtain airbag main body are superposed on each other follows the separation direction;
the initial deployment force, generated upon inflation and deployment of the curtain airbag main body, is acted in the separation direction, to push open the pillar trim toward the inside of the cabin, and to deploy the curtain airbag main body downward from a gap between the pillar trim and the pillar part toward the inside of the cabin;
in the twisted part, a tip end part of the folded part is positioned toward an outside of the vehicle body;
said attachment member attaches the pillar trim to the pillar part so as to allow said pillar trim to move relative to the pillar part in a direction in which the pillar trim is entirely pushed open toward the inside of the cabin without causing substantial deformation of said pillar trim itself by the initial deployment force generated upon inflation and deployment of the curtain airbag main body; and
the attachment member has a first member which is fixed to the pillar part, and a second member which is fixed to the pillar trim and is inserted to the first member in a slidable manner toward the inside of the cabin.

2. The curtain airbag device for a vehicle according to claim 1, wherein the regulating member has an upper regulating part for regulating an upper surface of the twisted part, and a side regulating part for regulating a side surface, at an upper part within the cabin, of the twisted part.

3. The curtain airbag device for a vehicle according to claim 2, wherein the attachment member is disposed in a vicinity of the twisted part.

4. The curtain airbag device for a vehicle according to claim 1, wherein the roof side rail part is provided with an inflator for supplying inflation and deployment gas to the airbag main body located in a section corresponding to the roof side rail part, and the twisted part is provided in a position corresponding to an adjacent part between the pillar part and the roof side rail part.

5. The curtain airbag device for a vehicle according to claim 2, wherein the roof side rail part is provided with an inflator for supplying inflation and deployment gas to the airbag main body located in a section corresponding to the roof side rail part, and the twisted part is provided in a position corresponding to an adjacent part between the pillar part and the roof side rail part.

6. The curtain airbag device for a vehicle according to claim 3, wherein the roof side rail part is provided with an inflator for supplying inflation and deployment gas to the airbag main body located in a section corresponding to the roof side rail part, and the twisted part is provided in a position corresponding to an adjacent part between the pillar part and the roof side rail part.

* * * * *